United States Patent
Lewis et al.

(10) Patent No.: US 9,387,525 B2
(45) Date of Patent: Jul. 12, 2016

(54) NEAR-SURFACE NATURAL GAS COLLECTION MANIFOLD

(71) Applicants: Delaney Lewis, West Monroe, LA (US);
Jose Urrutia, Suwanee, GA (US);
Michael Ayers, Alpharetta, GA (US)

(72) Inventors: Delaney Lewis, West Monroe, LA (US);
Jose Urrutia, Suwanee, GA (US);
Michael Ayers, Alpharetta, GA (US)

( * ) Notice: Subject to any disclaimer, the term of this patent is extended or adjusted under 35 U.S.C. 154(b) by 0 days.

(21) Appl. No.: 13/792,705

(22) Filed: Mar. 11, 2013

(65) Prior Publication Data
US 2014/0251473 A1 Sep. 11, 2014

(51) Int. Cl.
| | | |
|---|---|---|
| *B09C 1/00* | (2006.01) | |
| *B09B 1/00* | (2006.01) | |
| *F16L 55/165* | (2006.01) | |
| *F16L 55/1645* | (2006.01) | |

(52) U.S. Cl.
CPC ............ *B09B 1/006* (2013.01); *F16L 55/1645* (2013.01); *F16L 55/1656* (2013.01); *Y02W 30/30* (2015.05); *Y10T 137/87571* (2015.04)

(58) Field of Classification Search
CPC ............................ B09C 2101/00; B09B 1/004
USPC ................. 405/38, 43, 128.1, 128.15, 128.2, 405/128.7, 128.85, 129.85, 129.95
See application file for complete search history.

(56) References Cited

U.S. PATENT DOCUMENTS

| | | | |
|---|---|---|---|
| 3,593,478 | A | 7/1971 | Mason |
| 3,941,556 | A | 3/1976 | Pallagi |
| 4,483,641 | A | 11/1984 | Stoll |
| 4,487,054 | A | 12/1984 | Zison |
| 4,518,399 | A | 5/1985 | Croskell et al. |
| 5,221,159 | A | 6/1993 | Billings et al. |

(Continued)

FOREIGN PATENT DOCUMENTS

| | | |
|---|---|---|
| EP | 2361698 A1 | 8/2011 |
| GB | 589815 | 7/1947 |

(Continued)

OTHER PUBLICATIONS

International Search Report and the Written Opinion of the International Searching Authority; for International Application No. PCT/US14/26065; Aug. 11, 2014; 12 pages; International Searching Authority/United States, Alexandria, US.

(Continued)

*Primary Examiner* — John Kreck
*Assistant Examiner* — Patrick Lambe
(74) *Attorney, Agent, or Firm* — Gardner Groff Greenwald & Villenueva, P.C.

(57) ABSTRACT

A near-surface collection manifold for extracting and/or venting sub-surface gas from beneath a geomembrane includes a plenum defining an enclosure with an upper portion. A conduit extends upwardly from the upper portion of the plenum, the conduit communicating with the interior volume of the plenum and has external threads for receiving a threaded nut thereon. The conduit is adapted and provided for extending through an aperture in the geomembrane for withdrawing sub-surface gas from within the interior volume of the plenum and through the geomembrane. A gasket having an opening formed therein is slipped over the conduit and above the geomembrane so that the geomembrane is sandwiched between the gasket and the upper portion of the plenum. A threaded nut is fitted to the conduit and above the gasket for securing the gasket against the geomembrane, thereby sealing the geomembrane to the upper portion of the plenum.

15 Claims, 10 Drawing Sheets

(56) References Cited

U.S. PATENT DOCUMENTS

| | | |
|---|---|---|
| 5,259,697 A | 11/1993 | Allen et al. |
| 5,588,490 A | 12/1996 | Suthersan et al. |
| 5,893,680 A * | 4/1999 | Lowry et al. ............... 405/128.2 |
| 6,305,473 B1 | 10/2001 | Peramaki |
| 6,742,962 B2 | 6/2004 | Hater et al. |
| 6,749,368 B2 | 6/2004 | Ankeny et al. |
| 6,910,829 B2 | 6/2005 | Nickelson et al. |
| 7,153,061 B2 | 12/2006 | Nickelson et al. |
| 7,198,433 B2 | 4/2007 | Augenstein et al. |
| 7,309,431 B2 | 12/2007 | Degarie |
| 7,448,828 B2 | 11/2008 | Augenstein et al. |
| 7,722,289 B2 | 5/2010 | Leone |
| 7,972,082 B2 | 7/2011 | Augenstein et al. |
| 8,002,498 B2 | 8/2011 | Leone et al. |
| 8,047,276 B2 | 11/2011 | Stamoulis |
| 8,168,121 B2 | 5/2012 | Elkins |
| 8,192,111 B2 | 6/2012 | Zimmel |
| 8,398,335 B2 | 3/2013 | Stamoulis |
| 2003/0008381 A1 | 1/2003 | Augenstein |
| 2003/0111122 A1 | 6/2003 | Horton |
| 2004/0103886 A1 | 6/2004 | Benjey |
| 2004/0112607 A1 | 6/2004 | Beckhardt |
| 2005/0082830 A1 | 4/2005 | Voelker |
| 2005/0236042 A1 | 10/2005 | Hansen et al. |
| 2006/0034664 A1 | 2/2006 | Augenstein |
| 2008/0017558 A1 | 1/2008 | Pollock et al. |
| 2008/0080934 A1 * | 4/2008 | Duffney ................... 405/128.2 |
| 2009/0136298 A1 | 5/2009 | Augenstein et al. |
| 2011/0302876 A1 | 12/2011 | Giffin |

FOREIGN PATENT DOCUMENTS

| | | |
|---|---|---|
| JP | 11216440 A | 8/1999 |
| JP | 2003340392 A | 12/2003 |
| WO | 2007/103153 A3 | 9/2007 |
| WO | 2008/061294 A1 | 5/2008 |
| WO | 2011148139 A3 | 11/2012 |

OTHER PUBLICATIONS

Barometrically Enhanced Remediation Technology (BERT); Innovative Technology Summary Report, Mar. 2000, 28 pages, Prepared for U.S. Department of Energy, Office of Environmental Management, Office of Science and Technology, US.

International Search Report and the Written Opinion of the International Searching Authority; for International Application No. PCT/US14/22991; Jul. 3, 2014; 8 pages; International Searching Authority/United States, Alexandria, US.

* cited by examiner

NEAR-SURFACE NATURAL GAS COLLECTION MANIFOLD

BACKGROUND

As waste material decomposes in a landfill, it gives off various gases. In the past, it has been known to use pumps, piping, and wellheads to extract the gases from the landfill and collect the same. Such wellheads are often spaced about one per acre in a grid pattern. Such systems of collecting the gases can be shut down by many factors, including power failures. To prevent the undesirable build-up of such gases in the event of non-operation of the extraction system, it has often been known to employ a grid pattern of vents spaced between the extraction wellheads, often at the same one per acre density.

As described in published U.S. patent application Ser. No. 20060034664, conventional gas extraction wells at landfills often involve deep wells attached to a network of pipes and a gas pump (blower) that applies vacuum (negative pressure) to extract the gas from the stored waste as the waste decomposes. The profile of surface emission flux is recognized to lead to potential for some emissions away from the wells under many circumstances. Note also that there is almost always entrainment of gas, whether LFG or atmospheric air, through the surface area most proximate to deep collection. Both LFG emission far from wells, and air entrainment proximate to subsurface collection, are well recognized as deleterious to collection efficiency. A "tradeoff" exists between extracting or "pulling" at too high a flow rate and entraining excessive atmospheric air, and pulling too little and recovering less LFG. This poses one dilemma of conventional extraction.

A prior art arrangement according to the above published patent application is shown in FIG. 1. Landfill 1 containing waste 2 generates biogas (biogas flows shown by the arrows). Biogas is collected and extracted through a well 3. The well 3 includes a gas-collecting well screen 16 and a gas-impermeable conduit 17 linking the well screen to the surface to draw biogas from the wellhead to the surface. Overlaying the majority of the waste 2 is a gas-permeable layer 5. The term "wellhead" refers to a portion of the gas-extraction well from which gas can be extracted. The well often includes a section of pipe having slots or other gas-flow apertures cut in it, referred to as a "well screen". Often, the well screen is also surrounded with gravel. The gas-permeable layer is typically composed of a conductive porous matrix with gas flow paths. Often it is composed of rigid or semi-rigid particles of a large enough size to leave a significant void volume between particles. For instance, the gas-permeable layer may contain sand, gravel, wood chips, or shredded tires. Above the gas-permeable layer is a gas-containment layer 7. Biogas that rises from the landfill reaches the gas-permeable layer where it is trapped by the overlying gas-containment layer 7. The biogas migrates horizontally in the gas-permeable layer until it comes close to a well. Gas extraction from the well creates a vacuum that draws gas into the well. This vacuum draws biogas from the overlying gas-permeable layer down through the waste mass of the landfill to reach the well. The area immediately beneath the gas-permeable high conductivity layer 5 through which a substantial fraction of the biogas from the gas-permeable layer passes as it travels to the gas-collection wellhead is the entrainment zone 9. On its passage through the waste 2, the gas from the gas-permeable layer mixes with biogas produced in the waste mass that has not gone through the gas-permeable layer. This helps to give a consistent content to the biogas that is withdrawn from the well. If gas is withdrawn directly from the gas-permeable conductive layer, the gas composition will vary more dramatically over time, sometimes containing a high air content and sometimes not. It is sometimes desirable to place an even more impermeable layer, such as geomembrane 15, directly over the zone of entrainment of gas from the permeable layer that is created by the deep well. Moreover, sometimes the entire landfill is covered with such a membrane.

FIG. 2 shows another prior art arrangement, this time showing a more shallow wellhead 26 used to withdraw near-surface or sub-surface gas from beneath a membrane M capping a waste W. The wellhead 26 is attached to an above-ground conduit by way of a vertical pipe. Where the pipe extends through the membrane M, such is prone to gas leakage out and/or air leakage in (depending on the relative pressures in the waste W and the atmosphere). To address this, it has been known in the prior art to install a polymer boot B which typically is bonded (welded or glued) to the membrane M and bonded or clamped to the pipe P. Unfortunately, such boots are rather prone to leakage and the seal provided thereby is less than ideal.

Similarly, the vents used between extraction wellheads can benefit from a manifold that would collect the gas to be vented and that would route the collected gas up and through a membrane or other landfill covering.

Accordingly, it can be seen that there exists a need for a better way for collecting sub-surface gas from near the surface of landfills. It is to the provision of solutions to this and other problems that the present invention is primarily directed.

SUMMARY OF THE INVENTION

In a first example form the present invention comprises a near-surface manifold for extracting or venting sub-surface gas from beneath a geomembrane. The manifold includes a plenum for gathering in sub-surface gas, and the plenum preferably includes an enclosure with a substantially flat upper portion and defines an interior volume. A conduit is rigidly connected to and extends upwardly from the substantially flat portion of the plenum, the conduit communicating with the interior volume of the plenum and has external threads for receiving a threaded nut thereon. The conduit is adapted and provided for extending through an aperture in the geomembrane for withdrawing and/or venting sub-surface gas from within the interior volume of the plenum and through the geomembrane.

Optionally, a substantially flat gasket having an opening formed therein is slipped over the conduit and above the geomembrane so that the geomembrane is sandwiched between the gasket and the substantially flat upper portion of the plenum. Alternatively, the gasket can be placed below the geomembrane or one gasket can be placed above the geomembrane and another gasket below the geomembrane. In a preferred embodiment, the gasket is placed against the plenum and the geomembrane is positioned atop the gasket. A threaded nut is fitted over the external threads of the conduit and above the flat gasket or geomembrane for securing the gasket against the geomembrane, thereby sealing the geomembrane to the substantially flat upper portion of the plenum.

Optionally, a substantially flat washer is positioned between the threaded nut and the gasket to avoid galling the gasket as the nut is tightened.

In one example form, the plenum is generally round with a recessed peripheral groove bearing perforations therein for admitting gas therethrough. In another form the plenum is generally box-like and has perforations formed therein for admitting sub-surface gas.

Optionally, the conduit rigidly connected to and extending upwardly from the substantially flat portion of the plenum has a threaded distal end for coupling to an external conduit or coupling.

Preferably, the substantially flat gasket comprises a compressible seal. In one form, the substantially flat gasket comprises a polymeric sheet. Preferably, it is annular and or disk-like. Preferably, the substantially flat gasket comprises a resilient material.

Preferably, the conduit rigidly connected to and extending upwardly from the substantially flat portion of the plenum is welded to the plenum.

Alternatively, instead of the plenum having a flat upper surface, the plenum can have a contoured surface. For example, the plenum can be curved. In one example form, the plenum can be cylindrical.

Optionally, the geomembrane can be sandwiched between an upper surface of the collection manifold and a nut threaded onto the conduit extending up from the collection manifold. Alternatively, a resilient gasket can be placed over the geomembrane, under the geomembrane, or one over and one under the geomembrane. Also, the geomembrane can be held in a generally flat configuration where it interacts with the collection manifold or it can be forced to follow the contour of a non-flat collection manifold.

BRIEF DESCRIPTION OF THE DRAWING FIGURES

DESCRIPTION OF EXAMPLE EMBODIMENTS

The present invention relates to a near-surface collection manifold for extracting and/or venting sub-surface gas and the like from near the surface of landfills using a geomembrane M for capping a waste field W. The geomembrane M is generally impermeable to contain or cap the waste below, thereby restricting the sub-surface gas from flowing into the atmosphere and restricting atmospheric air from flowing into the waste below the geomembrane M.

Figure 1:
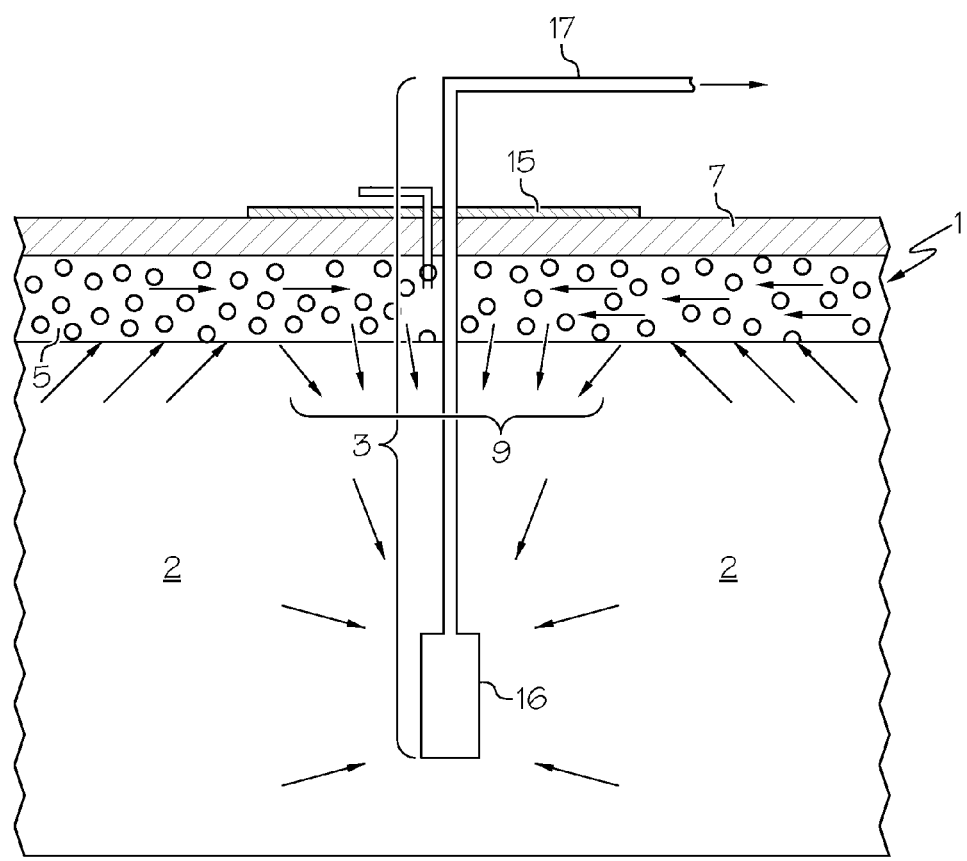
FIG. 1 is a schematic illustration of a first prior art wellhead for extracting sub-surface gas from a waste landfill.
Figure 2:
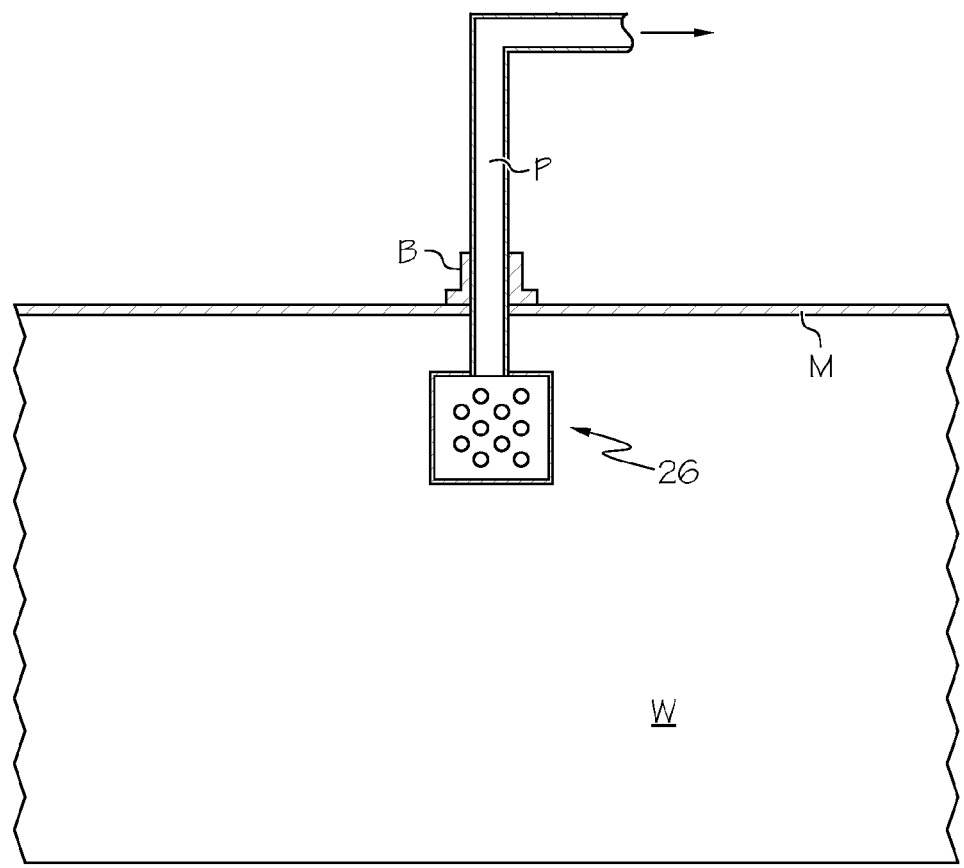
FIG. 2 is a schematic illustration of a second prior art wellhead for extracting sub-surface gas from a waste landfill.
Figure 3:
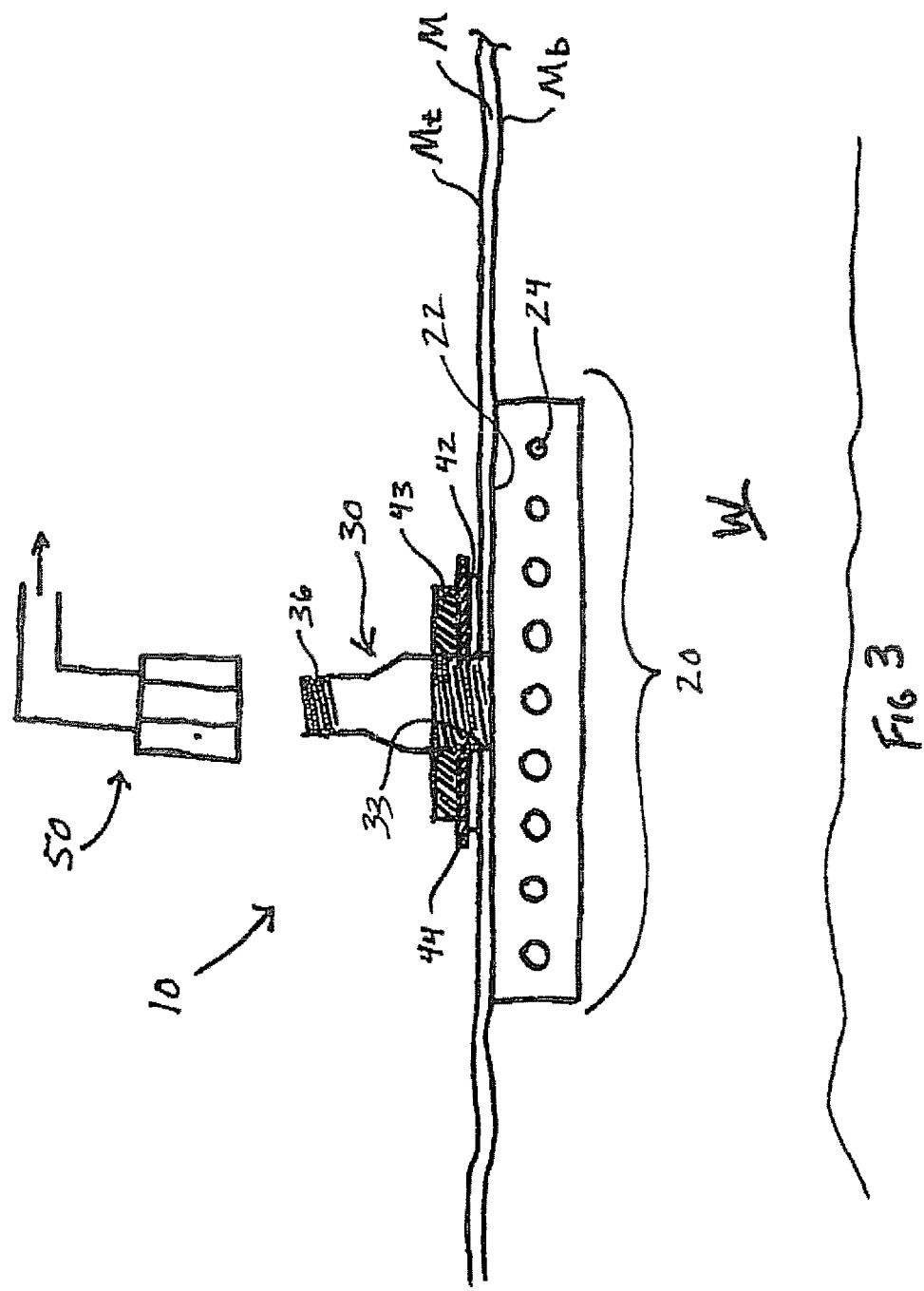
FIG. 3 is a schematic, partially-exploded sectional view of a collection manifold for extracting and/or venting sub-surface gas from a waste landfill according to a preferred example form of the present invention.

FIG. 3 is a schematic, partially-exploded sectional view of the collection manifold 10 for extracting and/or venting sub-surface gas from a waste landfill according to a preferred example embodiment of the present invention. The collection manifold 10 includes a generally box-like plenum 20 having an enclosure with a substantially flat upper portion 22 defining an interior volume, and perforations 24 are formed in the plenum to provide for the admission of sub-surface gas into the interior volume. When the collection manifold 10 is mounted adjacent the geomembrane M, the plenum 20 sits close below the geomembrane M proximal the waste W, allowing the substantially flat upper portion 22 of the plenum 20 to contact a bottom surface Mb of the geomembrane M. A threaded conduit 30 extends upwardly from the substantially flat upper portion 22 and communicates with the interior volume of the plenum 20 and preferably is fitted loosely within the plenum until such time as the nut it tightened, thereby tightening the threaded conduit to the plenum. Alternatively, the conduit can be rigidly connected to the plenum by welding. For example, see weld 33 extending along the outer contour of the conduit 30 in contact with the substantially flat upper portion 22 (see FIG. 4). Optionally, the conduit 30 can be integrally formed with the plenum. Also, the conduit can have coupling features for mounting to the geomembrane M.

The conduit 30 extends through a central opening of a flat gasket 42 so that the geomembrane M is sandwiched between the flat gasket 42 and the substantially flat upper portion 22 of the plenum 20. Preferably, the flat gasket 42 is formed from a resilient material for providing a compressible seal. In one form, the flat gasket 42 comprises a polymeric sheet having an annular and/or disc-like shape. Alternatively, the flat gasket 42 can be shaped as desired and can comprise other available materials. Optionally, a second flat gasket can be provided such that the geomembrane M is positioned between the two gaskets. In a preferred form, the gasket is placed against the flat upper surface of the plenum and the geomembrane is positioned over the gasket, with the nut above that. This creates an intimate contact between the flexible gasket and both the flat plenum and membrane when compressed by tightening the nut. Placement of the seal in this position also prevents leakage from the threads of the bulkhead fitting.

A threaded nut 43 engages external threads 35 of the conduit 30 above the flat gasket 42 and secures the flat gasket 42 against the geomembrane M, thus sealing the geomembrane M to the substantially flat upper portion 22 of the plenum 20. Optionally, a large flat washer 44 is positioned between the threaded nut 43 and the gasket to provide a uniform clamping force and to avoid galling the flat gasket 42 as the threaded nut 43 is tightened (see FIG. 4).

Optionally, the conduit 30 has external threads 36 at a distal end for coupling to an external conduit or coupling 50. Optionally, other forms of coupling features may be provided for mounting the collection manifold 10 to the geomembrane M and to the optional external conduit 50. For example, pins, bolts, clamping mechanisms, or other available coupling features can be employed.

Figure 4:
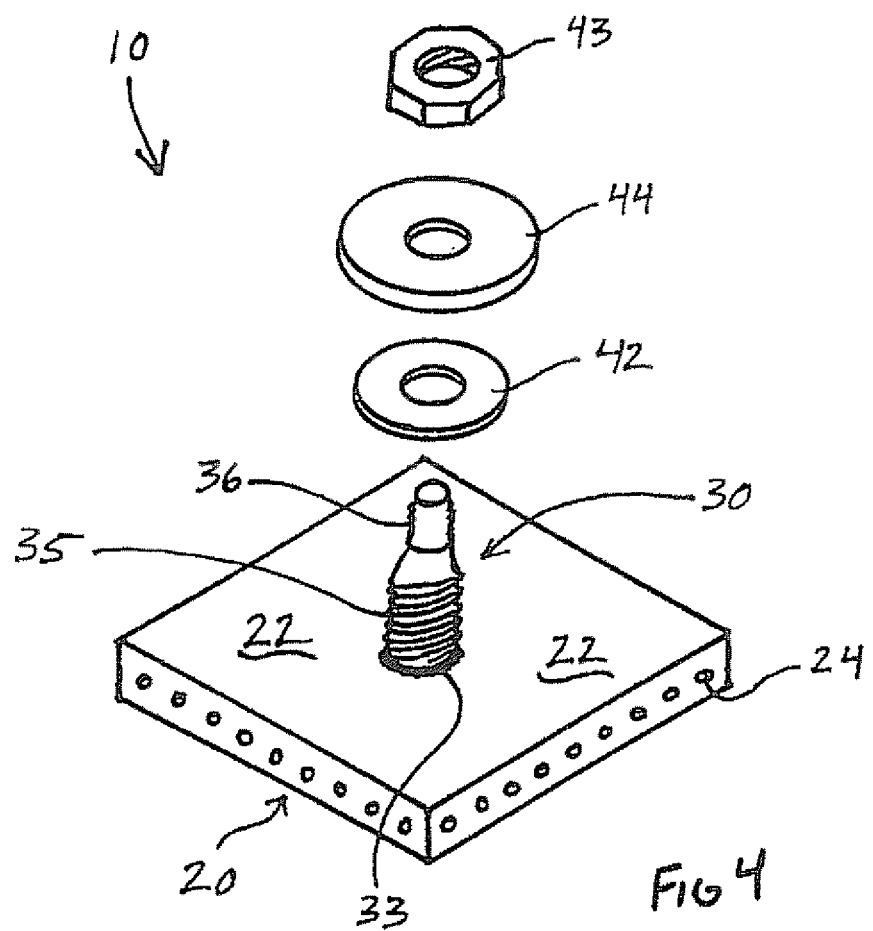
FIG. 4 is a schematic partially-exploded perspective view of the collection manifold of FIG. 3.

FIG. 4 shows a partially-exploded perspective of the near-surface collection manifold 10 as described above. In commercial embodiments, the near-surface collection manifold 10 can be constructed from metals, durable plastics or other materials suitable for sealingly engaging the geomembrane and allowing the admission of natural gas within the interior volume and the conduit 30. Preferably, the plenum 20 and the conduit 30 are constructed of materials suitable for welding together, for example, steel, aluminum or other available materials. Preferably, the threaded nut 43 and the optional flat washer 44 are formed from metal or other material suitable for engaging the conduit 30 and sealing the geomembrane M to the substantially flat upper portion 22. Preferably, the perforations 24 formed with the plenum 20 can be shaped and sized as desired. The external conduit or coupling 50 can be formed from metals, plastics or other available materials.

Preferably, the portions of the collection manifold 10 contacting the bottom and top surfaces Mb, Mt of the geomembrane M (flat gasket 42 contacting top surface Mt and flat upper portion 22 of the plenum 20 contacting bottom surface Mb) are generally flat and have smooth surfaces to provide a uniform clamping force and effective sealing of the geomembrane M to the substantially flat upper portion 22. Optionally, the portions of the collection manifold 10 contacting the geomembrane M can have textured surfaces. For example, the substantially flat upper portion 22 (or other portion of the collection manifold 10 contacting the geomembrane M) can comprise a plurality of concentric rings defining a plurality of contact surfaces for improving the seal between the collection manifold 10 and the geomembrane M. Preferably, the one or more textured surfaces contacting the geomembrane M are configured to provide additional contact and sealing capabilities.

In further example embodiments, the plenum can be shaped as desired. Preferably, when the plenum comprises a contoured or non-planar surface, a mounting medium or clamping element, having a portion contoured to match the shaped surface of the plenum, can be positioned proximal to the top or bottom portion Mt, Mb of the geomembrane M to provide a uniform clamping force and effective sealing of the geomembrane to the plenum.

Figure 5:
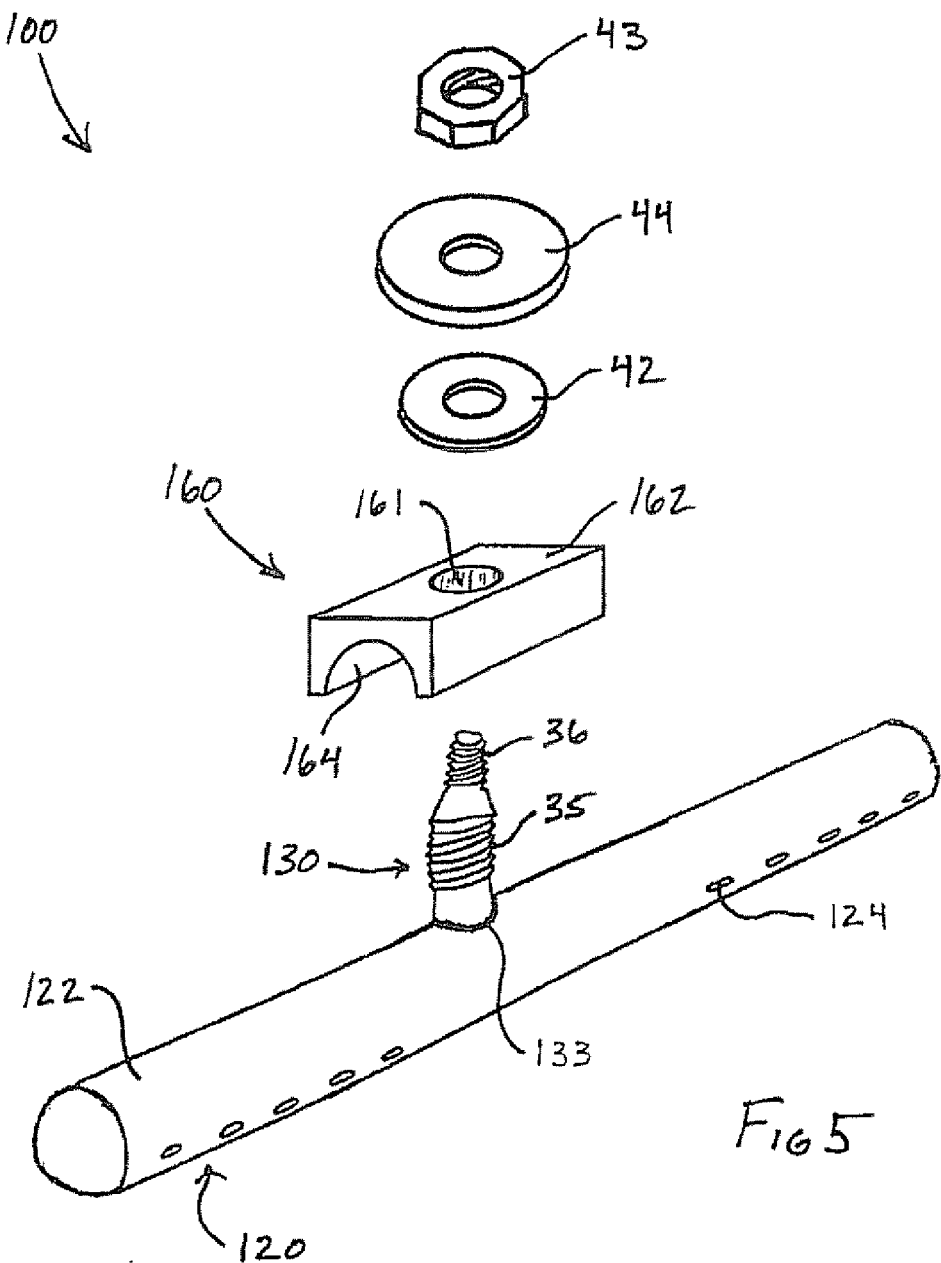
FIG. 5 is a schematic, partially-exploded sectional view of a collection manifold for extracting and/or venting sub-surface gas from a waste landfill according to a second preferred example form of the present invention.

For example, as depicted in FIG. 5, a near-surface collection manifold 100 includes a pipe-like plenum 120 having an enclosure with a substantially curved surface 122 defining an interior volume. Preferably, the conduit 130 is rigidly mounted to the plenum 120 (see weld 133) and communicates with the interior volume of the plenum 120. Also, perforations 124 are formed in the plenum 120 to provide for the admission of sub-surface gas into the interior volume. To provide a uniform clamping force for sealing the geomembrane M to the plenum 120, a mounting clamp or boss 160 is positioned between the bottom portion Mb of the geomembrane M and the curved surface 122 of the plenum 120. The mounting clamp 160 generally includes a substantially flat upper portion 162 for contact with the bottom portion Mb, a substantially contoured lower portion 164 corresponding to the curved surface 122 of the plenum 120, and a central opening 161 for allowing the conduit 130 to extend therethrough. Preferably, at least some of the perforations 124 in the plenum 120 are positioned to remain uncovered by the contoured surface 164 of the mounting medium 160 when the collection manifold 100 is mounted to the geomembrane M.

Figure 6:
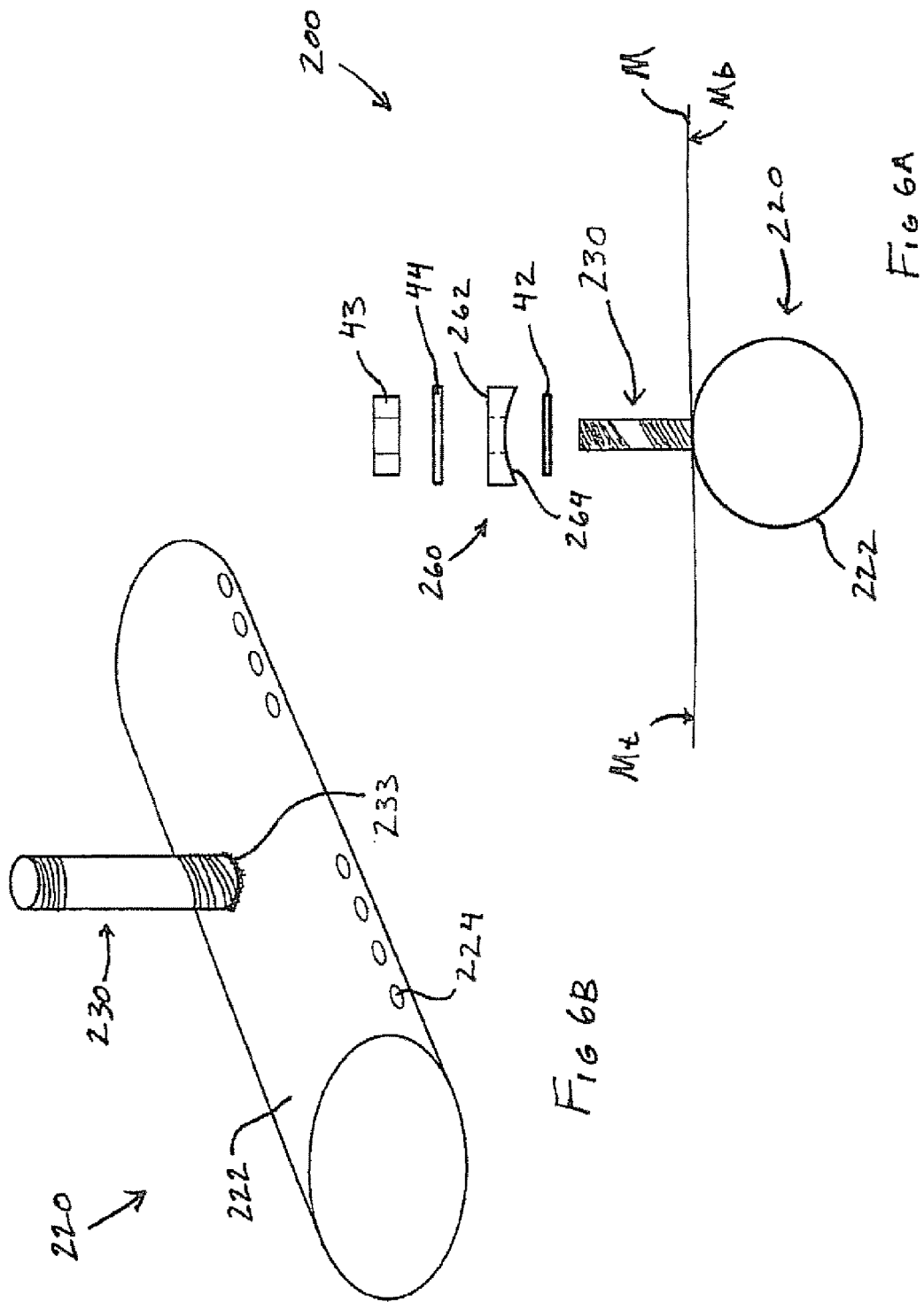
FIGS. 6A and 6B are schematic, partially-exploded sectional views of a collection manifold for extracting and/or venting sub-surface gas from a waste landfill according to a third preferred example form of the present invention.

Further, as shown in FIGS. 6A-B, another optional design for a collection manifold is depicted. Here, collection manifold 200 includes a barrel-shaped plenum 220 having an enclosure with a substantially curved surface 222 defining an interior volume. The conduit 230 is rigidly mounted to the plenum 220 (see weld 233) and communicates with the interior volume of the plenum 220. Also, perforations 224 are formed in the plenum 220 to provide for the admission of natural gas into the interior volume. To provide a uniform clamping force for sealing the geomembrane M to the plenum 220, a clamping element 260 is positioned between the top portion Mt of the geomembrane M and the threaded nut 43, thereby allowing the geomembrane M positioned between a contoured portion 264 of the clamping element 260 and the curved surface 222 of the plenum 220 to conform to the contoured portions 222, 264 and remain sealingly engaged therebetween. The clamping element 260 generally includes the contoured lower portion 264 corresponding to the curved surface 222 of the plenum 220, a substantially flat upper portion 262 for contact with the threaded nut 43, and a central opening for allowing the conduit 230 to extend therethrough. Optionally, the flat gasket 42 can be positioned between the clamping element 260 and the geomembrane M and/or the flat washer 44 can be positioned between the flat portion 262 of the clamping element 260 and the threaded nut 43.

As shown herein and described above, the geomembrane can be sandwiched between an upper surface of the collection manifold and a nut threaded onto the conduit extending up from the collection manifold. Alternatively, a resilient gasket can be placed over the geomembrane, under the geomembrane, or one over and one under the geomembrane. Also, the geomembrane can be held in a generally flat configuration where it interacts with the collection manifold (see FIGS. 3 and 4, for example) or it can be forced to follow the contour of a non-flat collection manifold (see FIGS. 6A and 6B, for example). Moreover, while the upright conduit is shown and described as welded to the plenum, other attachments are possible. For example, it could be integrally formed with the plenum, threaded into the plenum, etc.

Figure 7:
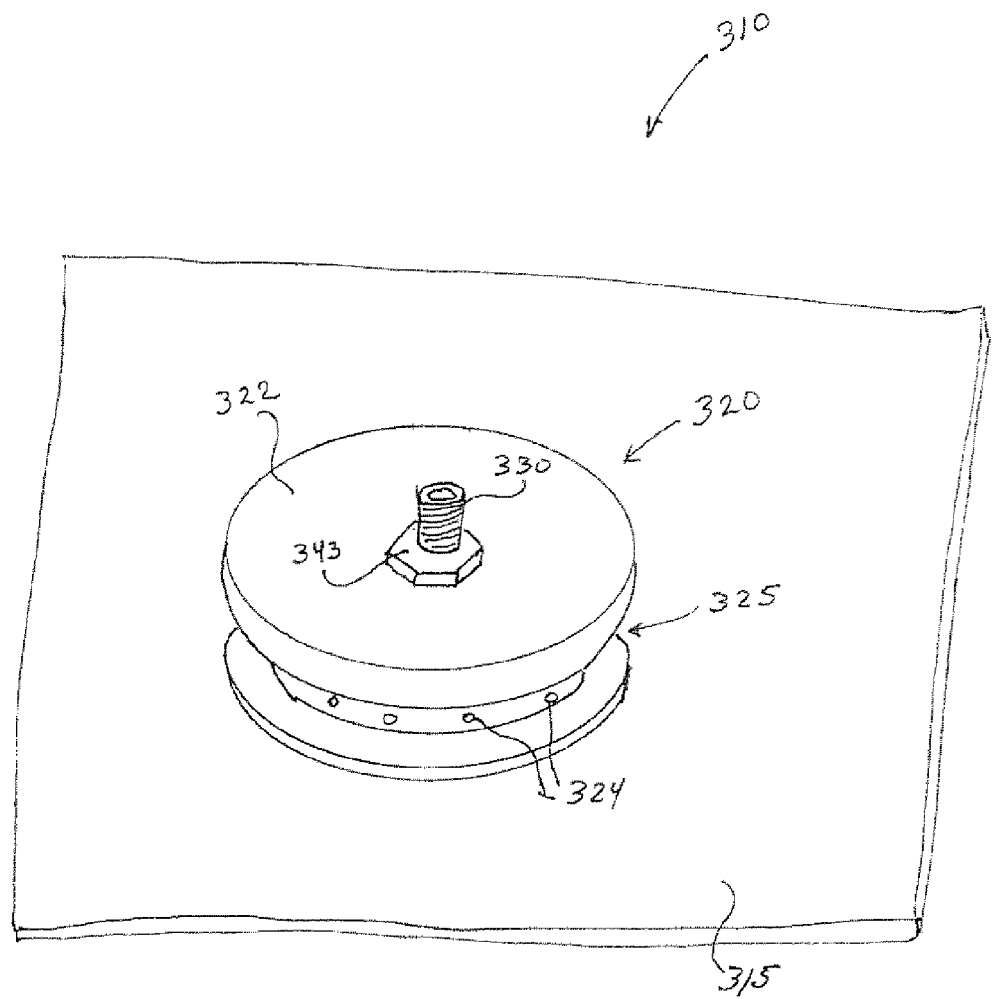
FIG. 7 is a schematic, perspective view of a collection manifold for extracting and/or venting sub-surface gas from a waste landfill according to a fourth preferred example form of the present invention.

FIG. 7 is a schematic perspective view of the collection manifold 310 for extracting and/or venting sub-surface gas from a waste landfill according to a fourth preferred example embodiment of the present invention. The collection manifold 310 includes a generally puck-shaped plenum 320 having an enclosure with a substantially flat upper portion 322 and defines an interior volume, and perforations 324 are formed in the base of a recessed peripheral groove 325 of the plenum to provide for the admission of sub-surface gas into the interior volume. The recessed groove 325 provides good protection against the membrane being drawn against the openings of the perforations 324 and blocking the perforations.

The manifold 310 includes a base plate 315 bonded to the underside of the plenum 320. In one preferred form, the base plate 315 is about 3 feet square and ½ inch thick. The purpose of the base plate 315 is to provide a sturdy base to help keep the manifold upright despite side loads that might tend to want to topple the manifold. Note that the plenum 320 preferably is round, while avoiding sharp corners that might tear the membrane M due to the close proximity of the plenum to the membrane. This is less of a concern with the base plate and the base plate can be provided with generally square corners or rounded corners, as desired. Preferably, both the base plate and the plenum are made of high density polyethylene or similar rugged polymers, but those skilled in the art will appreciate that various construction materials can be employed. In one preferred form, the plenum 320 is about 18 inches across and several inches tall.

When the collection manifold 310 is mounted adjacent the geomembrane M, the plenum 320 sits close below the geomembrane M proximal the waste W, allowing the substantially flat upper portion 322 of the plenum 320 to contact a bottom surface Mb of the geomembrane M. A threaded conduit 330 extends upwardly from the substantially flat upper portion 322 and communicates with the interior volume of the plenum 320 and preferably is rigidly connected to the plenum by plastic welding. Optionally, the conduit 330 can be integrally formed with the plenum. Also, the conduit can have coupling features for mounting to the geomembrane M.

The conduit 330 extends through a central opening of a flat gasket 342 so that the geomembrane M is sandwiched between the flat gasket 342 and the substantially flat upper portion 322 of the plenum 320. Preferably, the flat gasket 342 is formed from a resilient material for providing a compressible seal. In one form, the flat gasket 342 comprises a polymeric sheet having an annular and/or disc-like shape. Alternatively, the flat gasket 342 can be shaped as desired and can comprise other available materials. Optionally, a second flat gasket can be provided such that the geomembrane M is positioned between the two gaskets.

Figure 9:
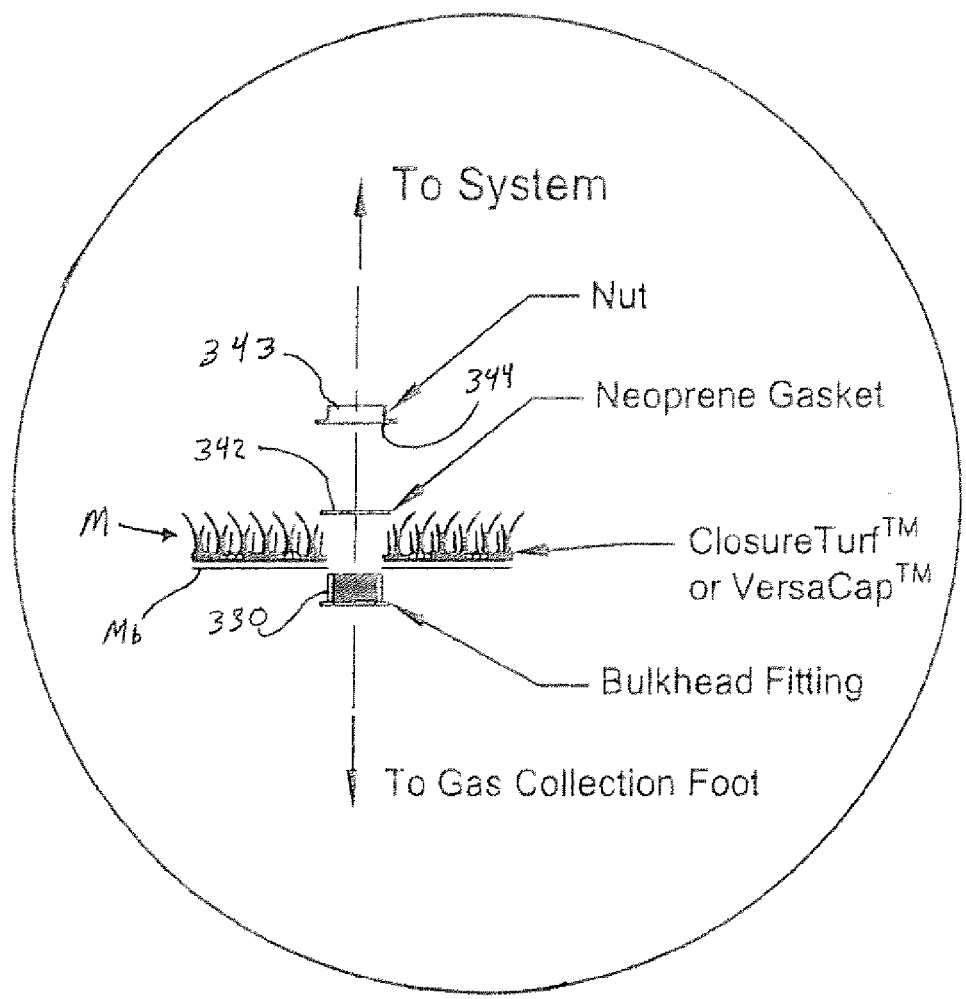
FIG. 9 is a schematic, partially-exploded sectional view of a portion of the collection manifold of FIG. 7.

A threaded nut 343 engages external threads 35 of the conduit 30 above the flat gasket 342 and secures the flat gasket 342 against the geomembrane M, thus sealing the geomembrane M to the substantially flat upper portion 322 of the plenum 320. Optionally, a large flat washer 344 is positioned between the threaded nut 343 and the gasket to provide a uniform clamping force and to avoid galling the flat gasket 342 as the threaded nut 343 is tightened. As shown in FIG. 9, the washer 344 can be integrally formed on an underside of the nut 343.

Figure 8:
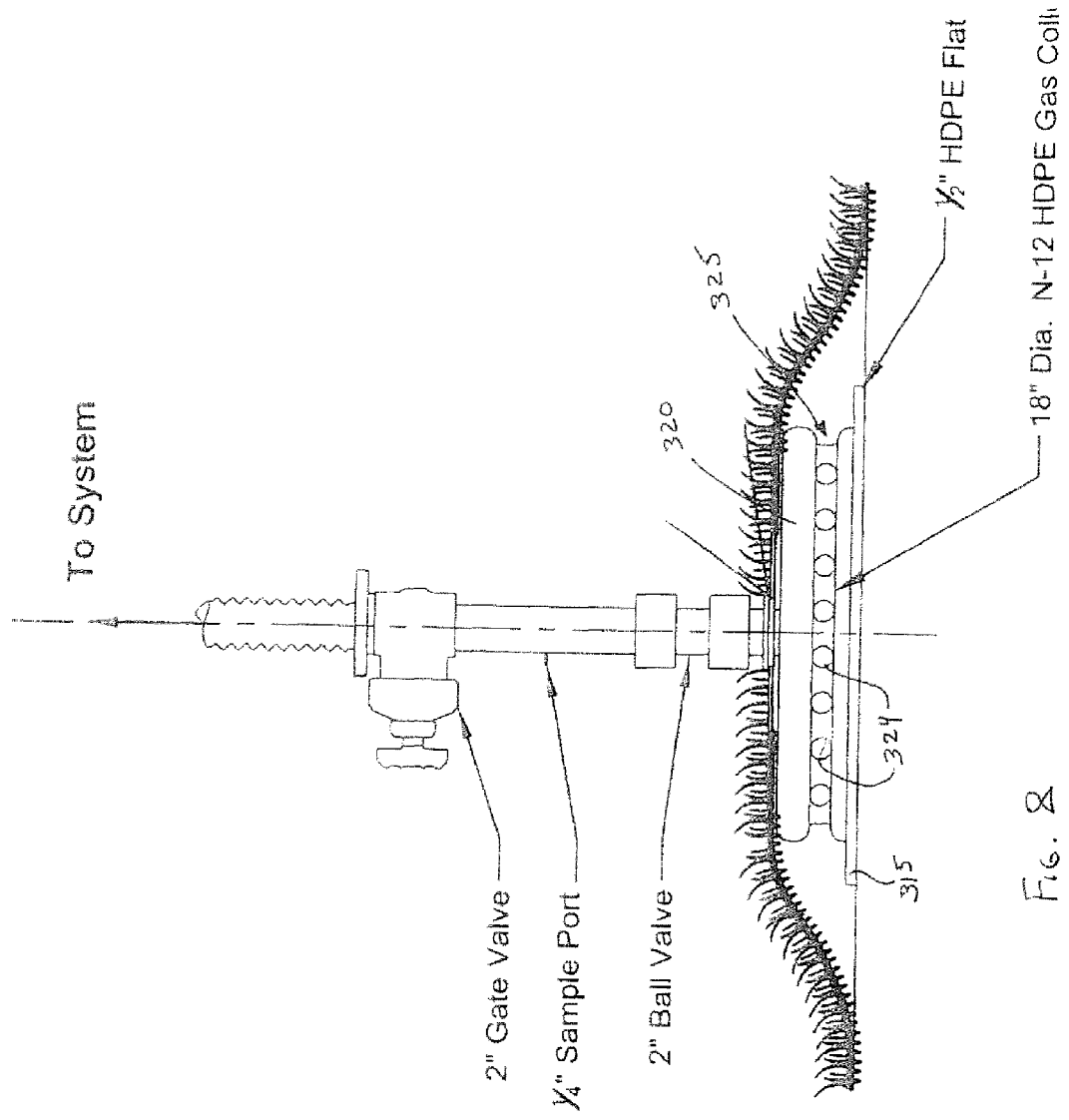
FIG. 8 is a schematic, sectional view of the collection manifold for extracting and/or venting sub-surface gas of FIG. 7, shown in conjunction with a gas extraction system.
Figure 10:
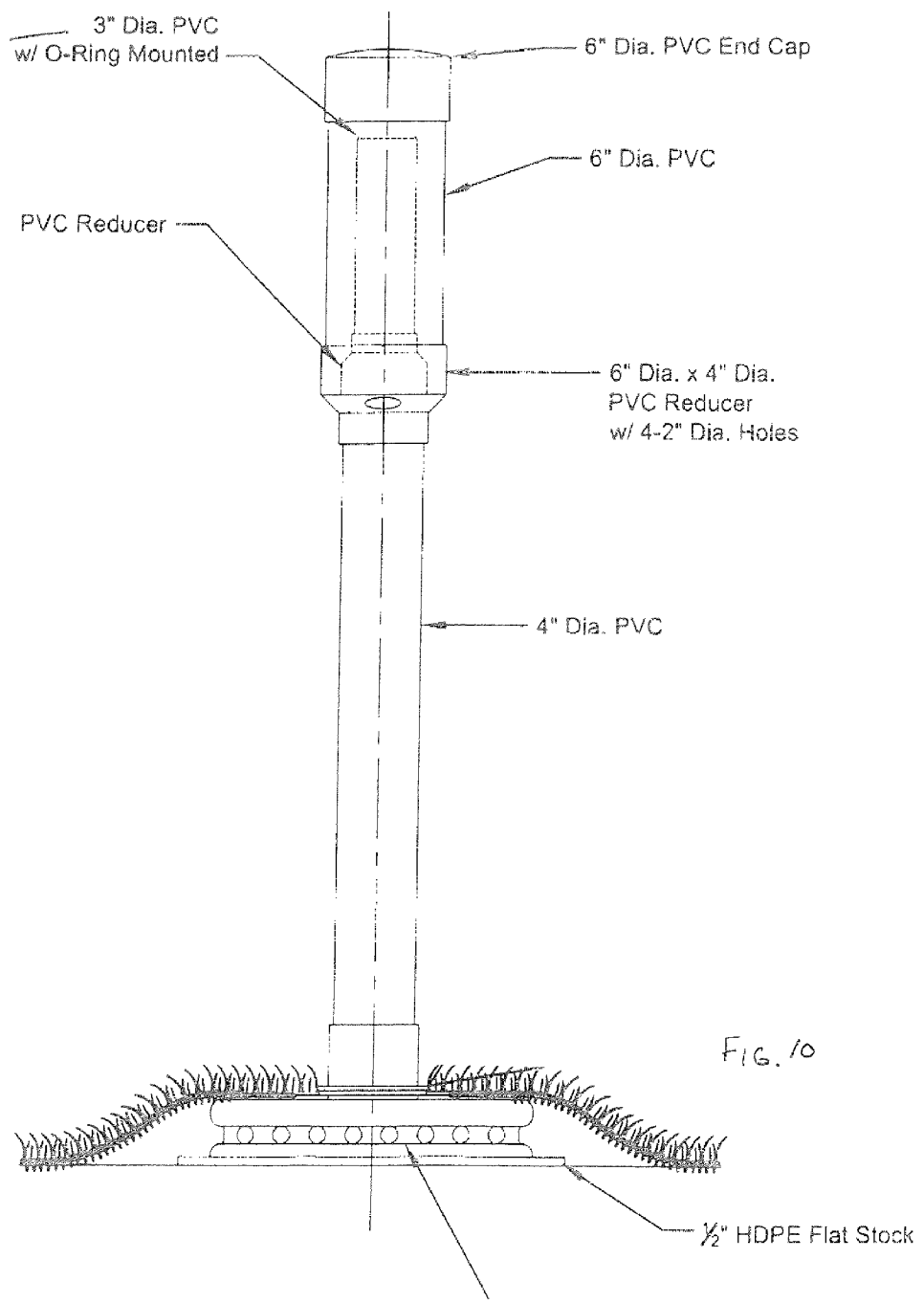
FIG. 10 is a schematic, sectional view of the collection manifold for extracting and/or venting sub-surface gas of FIG. 7, shown in conjunction with a passive gas vent.

As shown in FIG. 8, the collection manifold, such as collection manifold 310, can be connected to a gas extraction system. Alternatively, the collection manifold can also be connected to a vent or a vent system, as shown in FIG. 10.

To install the collection manifold, the collection manifold is placed in the ground under where the geomembrane is (or is to be positioned), with the conduit extending vertically. An opening is made in the geomembrane and the geomembrane is placed over the conduit and above the collection manifold. In this regard there are several ways to provide the opening in the membrane, such as cutting a single slit, cutting an X-shaped pair of slits, cutting a roughly circular hole (such as with a hole saw), punching a hole, etc. After the geomembrane is place over the conduit, the attachment thereto can be secured with the nut (and any optional washers/bosses, gaskets, etc., as described herein). Moreover, in those instances where it is desired to sandwich the geomembrane between two resilient gaskets, a first gasket is placed over the conduit before inserting the conduit up through the geomembrane. The geomembrane can take the form of a simple membrane or can be coupled to synthetic turf (as shown in FIG. 8).

The sub-surface gas to be collected and withdrawn with the present invention can be any of several sub-surface gases, such as natural gas.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A near-surface collection manifold for extracting, venting, or both extracting and venting sub-surface gas from beneath a geomembrane having an aperture formed therein, the collection manifold comprising:

a plenum for drawing in or receiving the sub-surface gas, the plenum comprising an enclosure defining an interior volume, wherein the enclosure includes a substantially flat upper portion, a lower portion, and a peripheral sidewall extending therebetween, wherein the peripheral sidewall includes an upper sidewall section extending downward from the enclosure upper portion, a lower sidewall section extending upward from the enclosure lower portion, and an intermediate section extending between the upper and lower sidewall sections, wherein the intermediate sidewall section has at least a portion that is inwardly-recessed from the upper and lower sidewall sections, wherein the inwardly-recessed intermediate sidewall section defines a smaller lateral dimension than the upper and lower sidewall sections and defines a recess that extends inwardly relative to the upper and lower sidewall sections, wherein the enclosure further comprises plural apertures for drawing in or receiving the sub-surface gas, and wherein the apertures are positioned in the inwardly-recessed intermediate sidewall section so that the apertures are laterally offset inwardly from the upper and lower sidewall sections and shrouded within the recess with the upper and lower sidewall sections positioned laterally outward relative to the apertures, wherein in use the geomembrane is spaced outwardly from the inwardly-recessed, apertured, intermediate sidewall section by interference with the non-recessed upper and lower sidewall sections and not blocking flow through the apertures of the sub-surface gas;

a conduit rigidly connected to and extending upwardly from the plenum, the conduit communicating with the interior volume of the plenum and having external threads, the conduit being adapted and provided for extending through the aperture in the geomembrane for communicating the sub-surface gas from within the interior volume of the plenum and through the geomembrane;

a substantially flat gasket having an opening formed therein and slipped over the conduit and above the geomembrane so that the geomembrane is sandwiched between the gasket and the substantially flat upper portion of the plenum; and a threaded nut fitted over the external threads of the conduit and above the flat gasket for securing the gasket against the geomembrane to seal the geomembrane to the substantially flat upper portion of the plenum.

2. A near-surface collection manifold as claimed in claim 1 further comprising a substantially flat washer positioned between the threaded nut and the gasket.

3. A near-surface collection manifold as claimed in claim 1 wherein the plenum is generally box-like.

4. A near-surface collection manifold as claimed in claim 1 wherein the plenum is generally puck-shaped.

5. A near-surface collection manifold as claimed in claim 1 wherein the substantially flat gasket comprises a compressible seal.

6. A near-surface collection manifold as claimed in claim 1 wherein the substantially flat gasket comprises a polymeric sheet.

7. A near-surface collection manifold as claimed in claim 1 wherein the substantially flat gasket is annular.

8. A near-surface collection manifold as claimed in claim 1 wherein the substantially flat gasket is disk-like.

9. A near-surface collection manifold as claimed in claim 1, further comprising a weld, wherein the conduit is rigidly connected to the substantially flat portion of the plenum by the weld.

10. A near-surface collection manifold as claimed in claim 1 wherein the substantially flat gasket comprises a resilient material.

11. A near-surface collection manifold for extracting, venting, or extracting and venting sub-surface gas from beneath a geomembrane having an aperture formed therein, the collection manifold comprising:
a plenum for receiving the sub-surface gas, the plenum comprising an enclosure with an upper portion and defining an interior volume, wherein the enclosure is generally round and has a peripheral sidewall including an upper sidewall section, a lower sidewall section, an intermediate sidewall section therebetween, a peripheral inwardly recessed groove formed around the plenum by the intermediate sidewall section and extending inwardly relative to the upper and lower sidewall sections, and a series of sidewall perforations for communicating the sub-surface gas from outside the plenum to inside the plenum, wherein the perforations are defined in the inwardly-recessed intermediate sidewall section so that the perforations are offset inwardly from the upper and lower sidewall sections with the upper and the lower sidewall sections positioned laterally outward relative to the perforations, and wherein the inwardly recessed groove acts as a shroud for the perforations to prevent the geomembrane from blocking the perforations;
a conduit rigidly connected to an extending upwardly from the upper portion of the plenum, the conduit communicating with the interior volume of the plenum and having external threads, the conduit being adapted and provided for extending through the aperture in the geomembrane for withdrawing the sub-surface gas from within the interior volume of the plenum and through the geomembrane; and
a threaded nut fitted over the external threads of the conduit for securing the geomembrane to the plenum to seal the geomembrane to the upper portion of the plenum.

12. A near-surface collection manifold as claimed in claim 1 wherein the recess forms a circumferential groove.

13. A near-surface collection manifold as claimed in claim 11 wherein the plenum is generally puck-shaped and the upper portion has upper-portion perforations formed therein for admitting the sub-surface gas.

14. A near-surface collection manifold for extracting, venting, or both extracting and venting sub-surface gas from beneath a geomembrane having an aperture formed therein, the collection manifold comprising:
a plenum for drawing in or receiving the sub-surface gas, the plenum defining an interior volume, wherein the plenum includes an upper portion, a lower portion, and a peripheral sidewall extending therebetween, wherein the peripheral sidewall includes an upper sidewall section, a lower sidewall section, and an intermediate section extending between the upper and lower sidewall sections, wherein the intermediate sidewall section has at least a portion that is inwardly-recessed from the upper and lower sidewall sections, defines a smaller lateral dimension than the upper and lower sidewall sections, and defines a recess that extends inwardly relative to the upper and lower sidewall sections, wherein the plenum further comprises plural apertures for drawing in or receiving the sub-surface gas, and wherein at least one of the apertures is defined in the inwardly-recessed intermediate sidewall section so that the at least one aperture is laterally offset inwardly from the upper and lower sidewall sections and shrouded within the recess with the upper and lower sidewall sections positioned laterally outward relative to the aperture, wherein in use the geomembrane is spaced outwardly from the inwardly-recessed, apertured, intermediate sidewall section by interference with the upper and lower sidewall sections and not blocking flow of the sub-surface gas through the apertures; and
a conduit rigidly connected to and extending upwardly from the plenum, the conduit communicating with the interior volume of the plenum and adapted to extend through the aperture in the geomembrane for communicating the sub-surface gas from within the interior volume of the plenum and through the geomembrane.

15. A near-surface collection manifold as claimed in claim 14 wherein the recess extends about the entire periphery of the plenum to form a continuous peripheral groove.

* * * * *